No. 669,506. Patented Mar. 12, 1901.
J. A. CLARK.
WIRE TIGHTENER.
(Application filed Aug. 8, 1900.)
(No Model.)
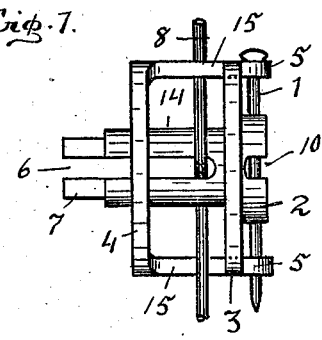
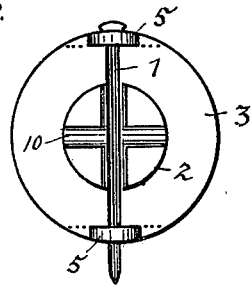
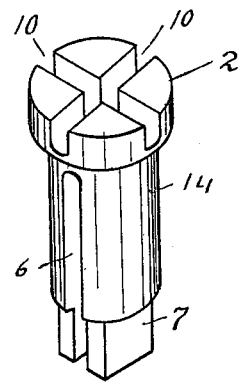
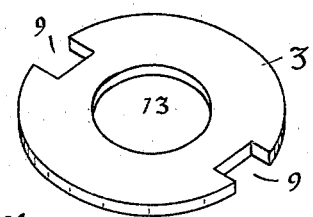
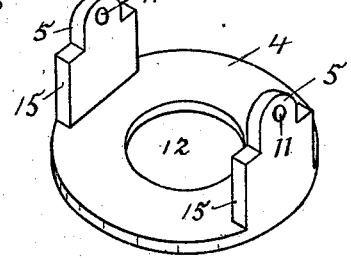
WITNESSES:
John A Clark INVENTOR
ATTORNEY.

UNITED STATES PATENT OFFICE.

JOHN A. CLARK, OF FORT WAYNE, INDIANA.

WIRE-TIGHTENER.

SPECIFICATION forming part of Letters Patent No. 669,506, dated March 12, 1901.

Application filed August 8, 1900. Serial No. 26,229. (No model.)

*To all whom it may concern:*

Be it known that I, JOHN A. CLARK, a citizen of the United States, residing at Fort Wayne, in the county of Allen and State of Indiana, have invented certain new and useful Improvements in Wire-Tighteners; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in wire-tighteners for wire fences; and the object of my improvement is to afford means for taking up the slack in the strands of wire fences.

I accomplish my object by the construction illustrated in the accompanying drawings, in which—

Figure 1 is a plan of my device mounted upon a wire strand. Fig. 2 is an end view showing the method of securing the head. Fig. 3 is a perspective view of the winding-stud. Fig. 4 is a perspective view of the securing-plate, and Fig. 5 is a perspective view of the yoke.

Similar numerals of reference indicate corresponding parts throughout the several views.

The winding-stud 14 is provided with a head 2, in which radial grooves 10 10 are made. The opposite end of the stud is made square, as shown at 7, so as to be readily connected with a wrench or other tool. A slot 6 ranges lengthwise through the greater portion of the stud and opens through the squared end 7.

The yoke consists of a disk 4, having an opening 12 of a size to receive the shank of the winding-stud. Arms 15 15 extend from the side of the disk and have ears 5 5, in which holes 11 11 are made.

The securing-plate consists of a disk 3, having an opening 13 of a size to receive the shank of the winding-stud. Recesses 9 9 are made in the periphery of said disk of a size to receive the ears 5 of said yoke.

In operating my device the securing-plate is slid over the shank of the winding-stud until it is engaged by the head 2. The stud is then placed upon the wire strand 8, with the wire passing through the slot 6. The yoke is then placed upon the stud, with the arms 15 passing upon opposite sides of the wire 8 and with the ears 5 passing through the recesses 9. While in this position a wrench or other tool is placed upon the squared end 7 of the stud and turned, thus winding the wire strand upon the shank of the stud until it is stretched to the desired tension. A nail or pin 1 is then passed through the holes 11 and one of the grooves 10 in the head 2, and thus the stud, securing-plate, and yoke are secured together, and the stud is also prevented from retracting.

Having described my invention, what I claim as new, and desire to secure by Letters Patent, is—

In a wire-tightener for fences, in combination, a winding-stud having a head, radial grooves in the head of said stud, an open slot ranging lengthwise in said stud, a yoke having an opening to receive said stud, perforated ears extending from the arms of said yoke, a securing-plate having an opening to receive said stud, and recesses to receive said ears, and a nail or pin adapted to engage said ears and one of the grooves in said head, substantially as shown and described.

In testimony whereof I affix my signature in presence of two witnesses.

JOHN A. CLARK.

Witnesses:
WILMER LEONARD,
F. E. PURCELL.